US007873606B2

(12) United States Patent
Dias et al.

(10) Patent No.: US 7,873,606 B2
(45) Date of Patent: Jan. 18, 2011

(54) ADVISOR FRAMEWORK, SYSTEMS, METHODS AND SOFTWARE FOR IMPLEMENTING THE SAME

(75) Inventors: Karl Dias, Foster City, CA (US); Alex Tsukerman, Foster City, CA (US); Gregory S. Smith, Merrimack, NH (US); Leng Tan, Sunnyvale, CA (US)

(73) Assignee: Oracle International Corporation, Redwood City, CA (US)

( * ) Notice: Subject to any disclaimer, the term of this patent is extended or adjusted under 35 U.S.C. 154(b) by 659 days.

(21) Appl. No.: 10/925,831

(22) Filed: Aug. 24, 2004

(65) Prior Publication Data

US 2006/0059170 A1    Mar. 16, 2006

(51) Int. Cl.
G06F 7/00 (2006.01)
G06F 17/00 (2006.01)
(52) U.S. Cl. ............... 707/692; 707/674; 707/690; 707/694
(58) Field of Classification Search ........... 707/1, 707/2, 10, 100, 104.1
See application file for complete search history.

(56) References Cited

U.S. PATENT DOCUMENTS

| | | | | | |
|---|---|---|---|---|---|
| 5,701,400 | A | * | 12/1997 | Amado | 706/45 |
| 6,934,701 | B1 | * | 8/2005 | Hall, Jr. | 1/1 |
| 6,954,715 | B2 | * | 10/2005 | Lu | 702/183 |
| 6,996,576 | B2 | * | 2/2006 | Vos et al. | 707/688 |
| 7,051,013 | B2 | * | 5/2006 | Horman et al. | 707/2 |
| 7,103,556 | B2 | * | 9/2006 | Del Rey et al. | 705/36 R |
| 7,107,253 | B1 | * | 9/2006 | Sumner, II et al. | 706/45 |
| 2002/0064149 | A1 | * | 5/2002 | Elliott et al. | 370/352 |
| 2002/0083067 | A1 | * | 6/2002 | Tamayo et al. | 707/100 |
| 2002/0087587 | A1 | * | 7/2002 | Vos et al. | 707/203 |
| 2002/0091708 | A1 | * | 7/2002 | Vos et al. | 707/104.1 |
| 2004/0215626 | A1 | * | 10/2004 | Colossi et al. | 707/100 |
| 2005/0027851 | A1 | * | 2/2005 | McKeown et al. | 709/224 |
| 2005/0086195 | A1 | * | 4/2005 | Tan et al. | 707/1 |
| 2005/0102292 | A1 | * | 5/2005 | Tamayo et al. | 707/10 |
| 2005/0144151 | A1 | * | 6/2005 | Fischman et al. | 706/45 |
| 2005/0160074 | A1 | * | 7/2005 | Vos et al. | 707/1 |
| 2005/0283488 | A1 | * | 12/2005 | Colossi et al. | 707/100 |
| 2008/0178079 | A1 | * | 7/2008 | Chen et al. | 715/700 |

* cited by examiner

*Primary Examiner*—Hosain T Alam
*Assistant Examiner*—Usmaan Saeed
(74) *Attorney, Agent, or Firm*—Townsend and Townsend and Crew LLP

(57) ABSTRACT

Various embodiments of the invention provide solutions that can offer a consistent framework for tools that assist in the configuration, tuning, and/or troubleshooting of a database and/or an RDBMS. Merely by way of example, one set of embodiments provides a software framework for an advisor component of a database and/or RDBMS. In accordance with some embodiments, the framework might specify a common data model for such advisor components. The data model can include, merely by way of example, a set of one or more findings (which might, in some cases, describe the result of an analysis of a circumstance in the database, RDBMS, and/or a mid-tier application used with the database) and/or a set of one or more recommendations (which might provide suggestions for addressing the circumstance). In particular embodiments. In particular embodiments, the data model might include a set of on or more rationales, which can explain the recommendations. In some cases, the software framework might include a task associated with the advisor component and/or one or more interfaces, which can include, inter alia, user interfaces and/or APIs. Other sets of embodiments can provide methods, systems and/or software programs for implementing an advisor framework.

29 Claims, 6 Drawing Sheets

ADVISOR FRAMEWORK, SYSTEMS, METHODS AND SOFTWARE FOR IMPLEMENTING THE SAME

BACKGROUND

The present invention relates generally to computer systems, and particularly to computer database management systems.

For years, databases have provided an efficient way to store and/or organize massive amounts of information, allowing searching, processing, etc. of that information in a relatively expeditious manner. In order to perform optimally, however, a database sometimes will need to be tuned, to account for variations among different implementations, changing data elements within the database, hardware modifications, etc., often by adjusting various operating parameters, etc. Moreover, the dynamic nature of many databases sometimes result in configuration problems, inconsistencies in data sets, and the like.

As databases and/or database management systems (sometimes referred to as "relational database management systems" or by the abbreviation "RDBMS") have grown more sophisticated in recent years, opportunities for performance/reliability enhancements through tuning have increased. As well, the mission-critical nature of many databases has resulted in a reduced tolerance for any problems with the database or the RDBMS. Thus, there has been an effort throughout the database industry to identify and address such issues as early as possible.

Further, in an effort to reduce administrator workload, many database vendors have attempted to automate as many database administration tasks as possible, with a goal of developing, as nearly as possible, a self-managing database. One avenue for pursuing this goal has been through the use of semi-automated tools, which attempt to guide an administrator through the process of addressing a tuning opportunities, tuning problems, etc. One challenge in the use of such tools, however, has been the lack of a consistent framework for such tools; generally, a database may have a variety of relatively specialized tools for assisting administrators with various tasks, but the relative specialization of such tools often results in inconsistent implementations and/or a relative lack of interoperability between such tools.

SUMMARY

Various embodiments of the invention provide solutions that can provide a consistent framework for tools that assist in the configuration, tuning, and/or troubleshooting of a database and/or an RDBMS. Merely by way of example, one set of embodiments provides a software framework for an advisor component of a database and/or RDBMS. In accordance with some embodiments, the framework might specify a common data model for such advisor components. The data model can include, merely by way of example, a set of one or more findings (which might, in some cases, describe the result of an analysis of a circumstance in the database, RDBMS, and/or a mid-tier application used with the database) and/or a set of one or more recommendations (which might provide suggestions for addressing the circumstance). In particular embodiments. In particular embodiments, the data model might include a set of one or more rationales, which can explain the recommendations. In some cases, the software framework might include a task associated with the advisor component and/or one or more interfaces, which can include, inter alia, user interfaces and/or APIs. Other sets of embodiments can provide methods, systems and/or software programs for implementing an advisor framework.

Merely by way of example, one set of embodiments provides a software framework, which can be used to address a circumstance in a database, facilitate an interaction between an advisor component and another entity, etc. In accordance with some embodiments, the software framework can comprise a task configured to perform an operation in a database, perhaps in response to a circumstance in the database, and/or an advisor component, which may be associated with the task. The task may govern the execution of the advisor component. The advisor component may also be configured to assist in the performance of the operation and/or may be configured to interact with an entity in a standardized manner. The entity can include, inter alia, a user of the database, another software component (including, e.g., another advisor component, etc.) and/or the like.

In particular embodiments, the advisor component may generate a data structure, which can comprise at least one finding and/or at least one recommendation, which may be based on the at least one finding. The at least one finding may comprise information about a result of an analysis performed by the advisor, and/or the at least one recommendation may comprise a set of at least one action to perform in response to the finding. The advisor may be configured, in some cases, to provide the at least one recommendation in a format that may be understood by the entity, such that the entity can perform the at least one action in response to the finding. The data structure may further comprise a rationale, which may explain a set of reasoning that supports the at least one recommendation. The data structure may adhere to a common data model, which may be specified by the software framework for a plurality of advisors, and/or the data structure may be extensible, such that the data structure can be configured to comprise at least one additional data element, which may address a specific need of the advisor component.

Another set of embodiments provides methods. An exemplary method of implementing a software framework to facilitate the management of a database can comprise providing a common data model, which may be used by a plurality of advisor components. The common data model can be similar to the data model described above and/or can comprise at least one finding, which may comprise information about a result of an analysis performed by the advisor, and/or at least one recommendation, which may be based on the at least one finding and/or may comprise a set of at least one action to perform in response to the finding. The method may further comprise providing at least one advisor component, which may be configured to generate a data structure adhering to the common data model.

In some cases, the at least one advisor component may be a plurality of advisor components, and the method may comprise interacting with each of the plurality of advisor components in the same way, according to the common data model. In other cases, the method may further comprise providing a common interface, which can be used by a plurality of advisor components and/or providing a common set of methods, which can be used to control a plurality of advisor components. The at least one advisor component may implement the common interface and/or may be configured to respond to the common set of methods.

Another exemplary embodiment provides a method of responding to a circumstance in a database. The method may comprise identifying a circumstance in the database and/or initiating a task in response to the circumstance. The task may comprise and/or be associated with an advisor component, which may, in some cases, comply with a software framework specifying a common data model for advisor components. In some embodiments, the method can further comprise analyzing the circumstance with the advisor component, producing (perhaps with the advisor component) at least one finding as a result of the analysis of the circumstance and/or generating at least one recommendation based on the at least one finding. The at least one recommendation may comprise a set of at least one action to perform in response to the finding, and/or the method may include providing the at least one recommendation in a format that may be understood by an entity, such that the entity can perform the at least one action in response to the finding. Optionally, the method may include generating a rationale that may explain a set of reasoning that supports the at least one recommendation.

In some cases, the entity (which may be, as noted above, a user of the database, another software component, etc.) may be allowed to manage the task. The method, then, may include receiving instructions from the entity that the at least one action should be performed and/or performing the at least one action. In other cases, providing the at least one recommendation may comprise providing a set of at least one command that, if executed by the entity, will result in the performance of the at least one action. The method might include the entity executing the at least one command.

A further set of embodiments provides systems, including computer systems, that can be used, inter alia, to implement the methods and/or software frameworks of the invention. Merely by way of example, a system in accordance with certain embodiments may comprise a database, a processor in communication with the database and/or a computer readable medium in communication with the processor.

The computer readable medium may include instructions executable by the processor. Such instructions may be executable, for instance, to provide a common data model (which can be similar to the common data model discussed above and/or elsewhere herein) and/or to provide at least one advisor component. The at least one advisor component (which also can be similar to such components discussed above and/or elsewhere herein) can be configured to generate a data structure that adheres to the common data model.

In accordance with other embodiments, the instructions may be executable to identify a circumstance in the database and/or initiate a task in response to the circumstance. The task may comprise an advisor component, and/or the instructions may be further executable to analyze the circumstance with the advisor component, generate with the advisor component at least one finding as a result of the analysis of the circumstance and/or generate with the advisor component at least one recommendation, which may be based on the at least one finding. The at least one recommendation may comprise a set of at least one action to perform in response to the finding and/or the instructions may be executable to provide the at least one recommendation in a format that may be understood by an entity, such that the entity can perform the at least one action in response to the finding. The finding(s) and recommendation(s) may be incorporated within a data structure that adheres to a common data model specified by a software framework. In particular cases, the computer system may include the advisor component.

Yet another set of embodiments provides software, including computer programs, which may be stored on computer readable storage media, that can be used to configure the systems of the invention and/or to implement the methods of the invention. Merely by way of example, in accordance with some embodiments, a computer program can be used to implement an advisor framework and/or may comprise instructions executable by a computer to provide a common data model to be used by a plurality of advisor components. The data model may be similar to those described above. The instructions also can be executable to provide at least one advisor component, which may be configured to generate a data structure that adheres to the common data model. The computer program may be incorporated in a relational database management system and/or may be configured to interoperate with a relational database management system.

A computer program in accordance with other embodiments may comprise an advisor component and/or a set of instructions executable by a computer. The instructions may be executable to identify a circumstance in the database and/or initiate a task in response to the circumstance. The task may control the advisor component, and/or the instructions can be further executable to analyze the circumstance with the advisor component, to produce at least one finding as a result of the analysis of the circumstance and/or to generate at least one recommendation, which may be based on the at least one finding. The at least one recommendation may comprise a set of at least one action to perform in response to the finding, and/or the instructions may be executable to provide the at least one recommendation in a format that may be understood by an entity, such that the entity can perform the at least one action in response to the finding.

The invention has been briefly summarized above. A further understanding of specific details and features of the invention may be realized by reference to the remaining portions of the specification and the drawings.

BRIEF DESCRIPTION OF THE DRAWINGS

Various Illustrative embodiments of the invention are illustrated in the drawings, in which.

DETAILED DESCRIPTION

1. General Overview

Figure 1A:
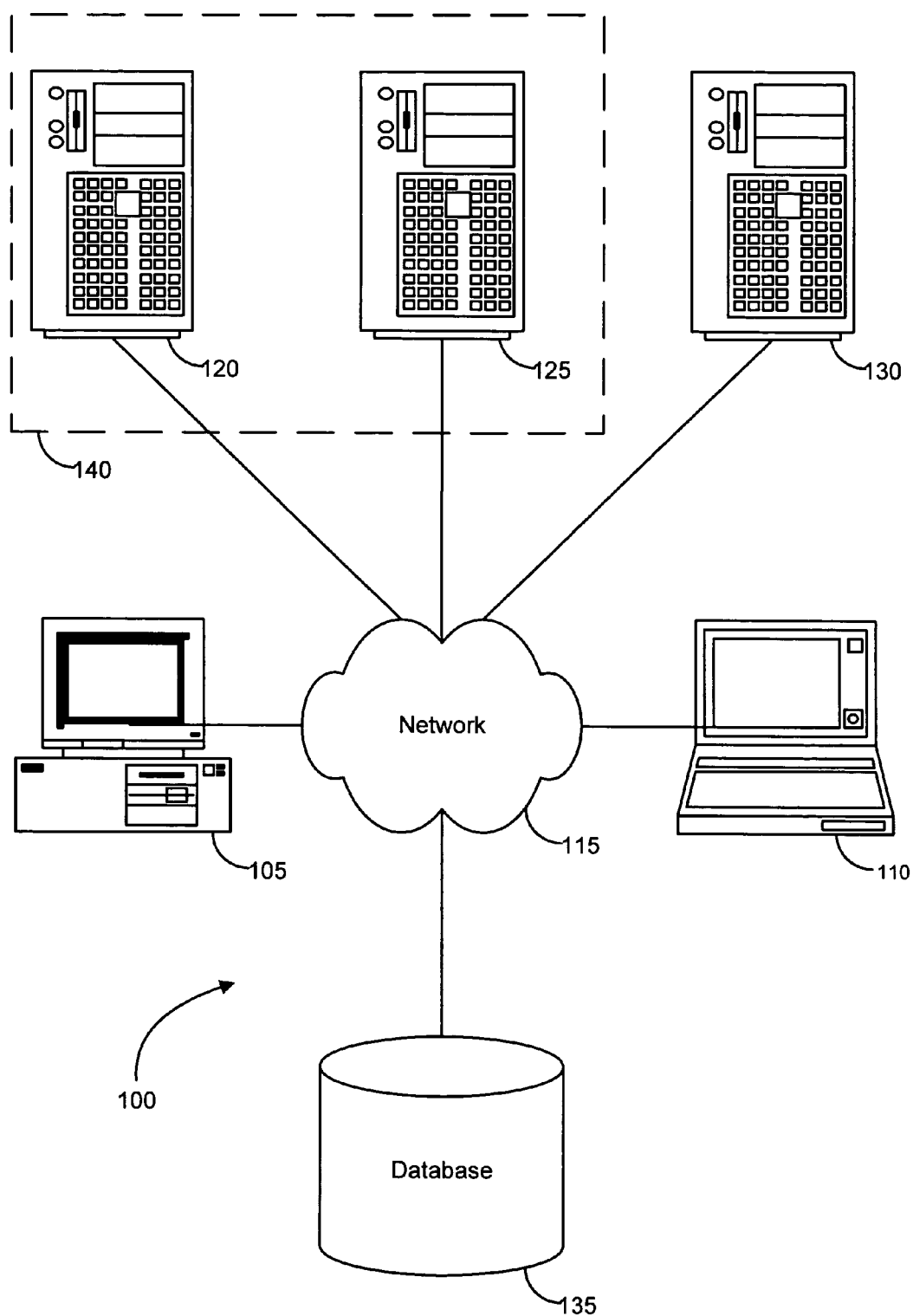
FIG. 1A is an architectural diagram of an exemplary computer network system that can provide and/or implement a framework for an advisor, in accordance with various embodiments of the invention.

Various embodiments of the invention provide solutions that can provide a consistent framework for tools that assist in the configuration, tuning, and/or troubleshooting of a database and/or an RDBMS. Merely by way of example, one set of embodiments provides a software framework for an advisor component of a database and/or RDBMS. In accordance with some embodiments, the framework might specify a common data model for such advisor components. The data model can include, merely by way of example, a set of one or more findings (which might, in some cases, describe the result of an analysis of a circumstance in the database, RDBMS, and/or a mid-tier application used with the database) and/or a set of one or more recommendations (which might provide suggestions for addressing the circumstance). In particular embodiments. In particular embodiments, the data model might include a set of on or more rationales, which can explain the recommendations. In some cases, the software framework might include a task associated with the advisor component and/or one or more interfaces, which can include, inter alia, user interfaces and/or APIs. Other sets of embodiments can provide methods, systems and/or software programs for implementing an advisor framework.

Those skilled in the art will appreciate that a variety of circumstances may arise in the use and/or administration of a database and/or and RDBMS that can necessitate (and/or provide the opportunity for) configuring, tuning, modifying and/or otherwise managing a database. (For ease of description, except where the context clearly indicates otherwise, the terms "RDBMS" and "database" may be used interchangeably. Those skilled in the art will appreciate that, while technically a database is an organized set of data, and an RDBMS is a software program configured to manage and/or interact with that set of data, the distinction between the terms often fades. For example, one may refer to executing a command in a "database" when referring to commands executed in an RDBMS, which then interacts with the database in response to the commands.) Such circumstances can include, without limitation, tuning opportunities, such as when a database is performing functionally, but tuning the database (e.g., adjusting one or more configuration parameters, such as transaction management parameters, memory management parameters, input/output ("I/O") parameters, cluster parameters, etc.) could provide enhanced performance, stability, usability and/or the like. Other circumstances can include configuration problems, which might prevent the database from fully functional operation, data inconsistencies, and/or the like. Those skilled in the art will appreciate, based on the disclosure herein, that there can be a wide variety of circumstances that could necessitate (and/or provide the opportunity for) managing a database.

In accordance with certain embodiments of the invention, an advisor may be provided to address such circumstances. As used herein, the term "advisor" means any tool (which may be implemented in a database, RDBMS, mid-tier application, database client, auxiliary program, and/or any other element of a database system) that can assist in addressing a circumstance (such as one described above and/or elsewhere herein) arising and/or existing in a database and/or can provide (either alone and/or in conjunction with other system elements) an automated and/or semi-automated way to address such a circumstance. Particular embodiments of the invention provide a framework for a model advisor, such that advisors complying with the framework can be expected to have a consistent data model and to interact predictably with other entities, including, inter alia, users and other software components (including other advisors).

In accordance with some embodiments, and advisor may be implemented in software and/or may allow an administrator (and/or user) to interact with the RDBMS (and/or the advisor itself) to assess and/or address the circumstance, e.g., through the use of display screens and/or panels that provide step-by-step assistance to the administrator (and/or user). In accordance with other embodiments, an advisor may not provide any visible indication to an administrator but instead may operate in an automated manner, perhaps providing a report to an administrator detailing any findings, recommendations and/or rationales (each of which are described in detail below) produced by the advisor and/or any actions taken by the advisor.

2. Exemplary Embodiments

Some embodiments of the invention, including without limitation those described generally above, may be performed in a computer system. FIG. 1A illustrates a block diagram of an exemplary system 100 depicting some such embodiments. The system 100 can include one or more user computers 105, 110, which may be used, inter alia, to configure and/or interact with other elements of the system 100, including for example, an RDBMS. The user computers 105, 110 can be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 105, 110 may also have any of a variety of applications, including one or more database client and/or server applications, web browser applications, etc. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA™, IPX™, AppleTalk™, and the like. Merely by way of example, the network 115 maybe a local area network ("LAN"), such as an Ethernet network, a Token-Ring™ network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 120, 125, 130. One or more of the servers (e.g., 130) may dedicated to running a mid-tier application, such as a business application, a web server, etc. Such servers may be used to operate databases (and/or RDBMS applications) and/or to allow for the administration of such databases and/or RDBMS systems, including providing advisors (and/or frameworks therefore) and/or responding to various circumstances in a database/RDBMS. In some cases, the servers 120, 125, 130 may accept input (including without limitation administrator input) from user computers 105, 110. A web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more general purpose computers capable of executing programs or scripts in response to the user computers 105, 110. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The server(s) may also include database servers, including without limitation those commercially available from Oracle™, Microsoft™, Sybase™, IBM™ and the like, which can process requests from database clients running on a user computer 105, 110.

In some embodiments, a mid-tier application server (such as a web server, for example) and/or a database server may create web pages dynamically for displaying on an end-user (client) system. The web pages created by such a server may be forwarded to a user computer 105 via a web server. Similarly, the web server can receive web page requests and/or input data from a user computer and can forward the web page requests and/or input data to a mid-tier application and/or a database server. In some cases, an administrator (merely by way of example, by interacting with an advisor) may respond to a circumstance in a database and/or otherwise configure and/or administer a database/RDBMS using a web browser interacting in the above manner with a server. Those skilled in the art will recognize that the functions described with respect to various types of servers may be performed by a single server and/or a plurality of specialized servers, depending on implementation-specific needs and parameters.

In accordance with some embodiments, one or more servers (e.g., 120, 125) may be database servers and/or may be configured to operate in a clustered environment (as indicated by the broken line 140 of FIG. 1). As defined herein, a cluster of computers can include one or more computers that are configured to operate in coordinated fashion, e.g., by providing parallel processing of instructions, responding to job requests cooperatively, maintaining multiple instances of an application and/or a database, and/or the like. In particular embodiments, a cluster may be configured to provide database services, and/or each member ("node") of a cluster may be configured to operate an RDBMS (such as Oracle 10g™), which may be a cluster-aware. Optionally, each server 120, 125 can have a separate partition and/or instance of a database managed by that database management program. The cluster, therefore, can provide database services on a scalable, high-availability basis familiar to those skilled in the art. Each of the servers 120, 125 may also include one or more "clusterware" programs familiar to those skilled in the art. One example of a clusterware program that may be employed in various embodiments is Oracle's Cluster Ready Services™ ("CRS"). In some cases, a particular server may be configured to run both an RDBMS and one or more mid-tier applications.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database (and/or may be managed by an RDBMS), such as Oracle 10g™, that is adapted to store, update, and retrieve data in response to SQL-formatted commands.

In particular embodiments, each database server 120, 125 (and/or each cluster node) may include its own database (which is shown on FIG. 1A, for ease of illustration, as a single database 135), which may be stored local to that server, on a network (including a SAN), etc. In some of these embodiments, each server's database may be an instance and/or partition of a common and/or clustered database, an arrangement familiar to those skilled in the art. In other embodiments, each database server 120, 125 may be configured to access a common instance of the database 135.

Figure 1B:
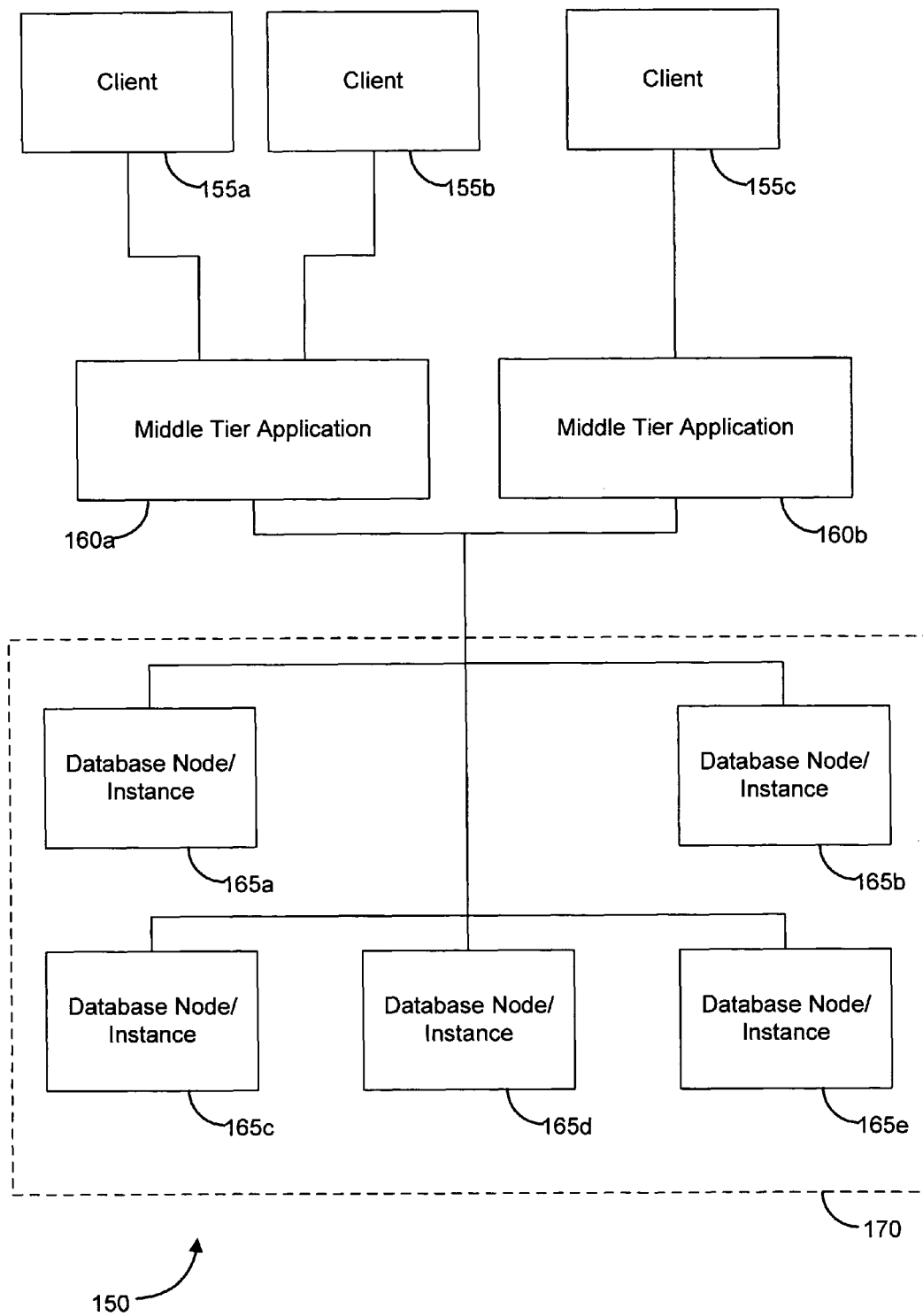
FIG. 1B is a block diagram of a multi-tiered database system that can provide and/or implement a framework for an advisor, in accordance with various embodiments of the invention.

FIG. 1B illustrates a block diagram of a multi-tiered system 150, depicting a relationship between various system components that may be typical of some embodiments. The system 150 may include one or more clients 155 (such as, for example, the clients described above), which may be running on an end user computer. Each of the clients may be in communication with one or more mid-tier applications 160, which, in turn, may be in communication with a database 165 (in some cases, this communication may be mediated by an RDBMS). In various embodiments, as described above, the database 165 may comprise a plurality of instances and/or partitions (e.g., 165a-e). In particular embodiments, each of the instances may be part of a cluster arrangement (denoted by the box 170). Thus, the system 150 may include a session and/or connection pooling scheme, whereby a client and/or mid-tier application simply submits a work request to a set of pooled sessions/connections, and the RDBMS (and/or another component, such as, for example, a clusterware application) allocates the work request based on node/instance availability, load balancing considerations, etc. In some cases, a system task may be automated with respect to a single node/instance of a replicated/clustered database. In other cases, a system task may be automated for an entire cluster/replication set (and/or some discretionary subset thereof).

Figure 1C:
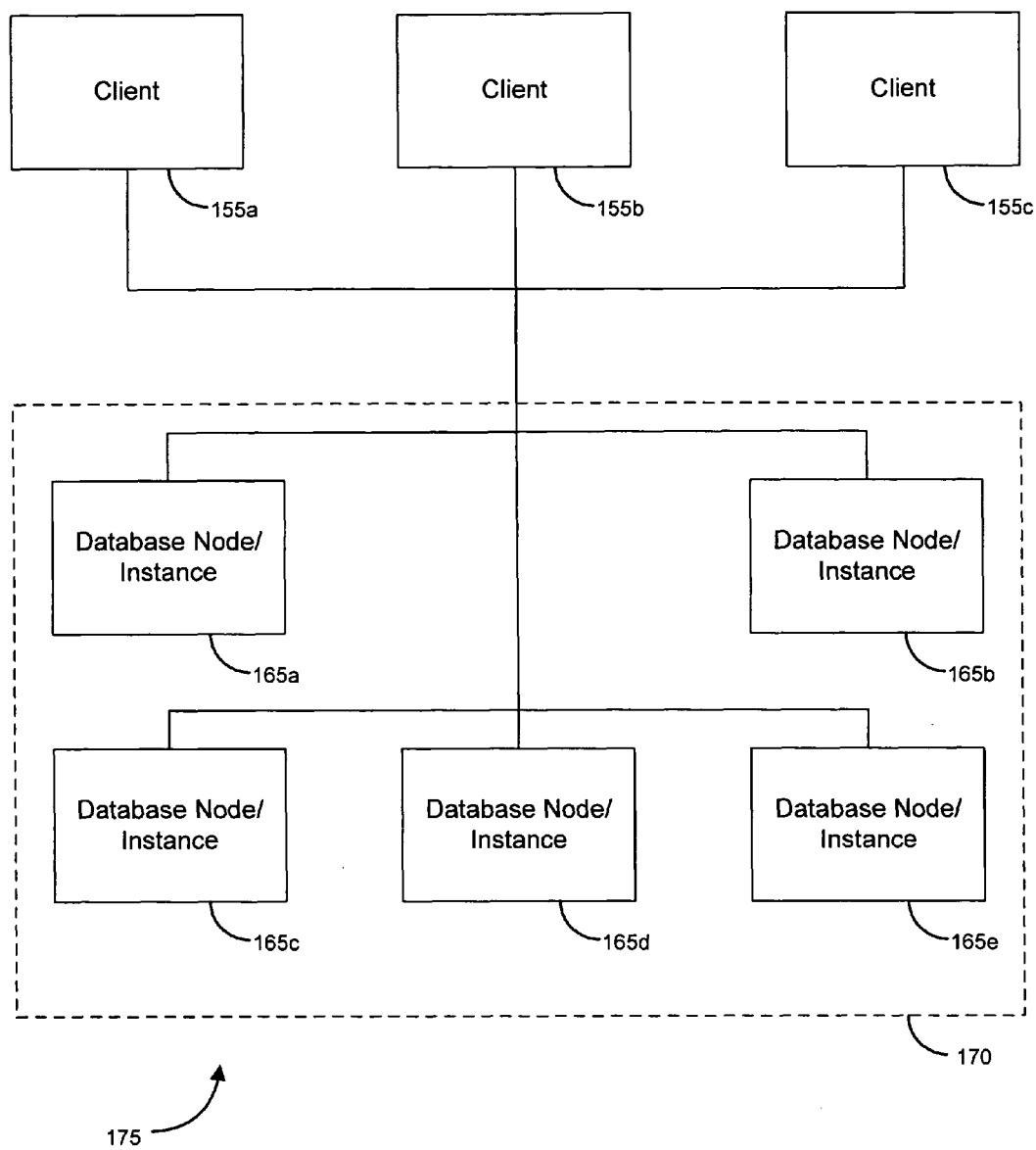
FIG. 1C is a block diagram of an alternative database system that can provide and/or implement a framework for an advisor, in accordance with various embodiments of the invention.

In other embodiments, some examples of which are depicted by the system 175 of FIG. 1C, one or more of the clients 155 may be in direct communication with the database 165 (and/or specific instances and/or partitions thereof). In some such embodiments, there may be no mid-tier application. In other embodiments, there may be a mid-tier application, and/or the system 175 may still be configured to allow a client 155 to access a database (and/or an RDBMS) directly. Some embodiments may operate under a client-server paradigm, well familiar to those skilled in the art.

Figure 2:
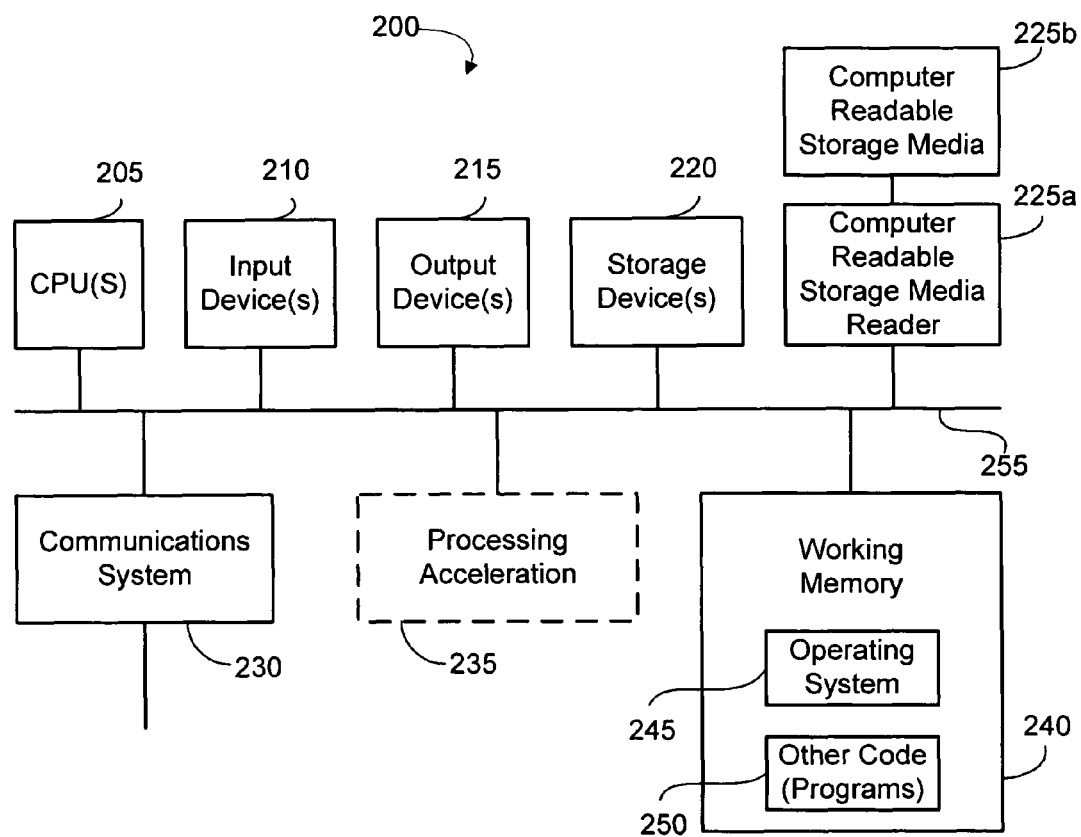
FIG. 2 is a generalized illustration of a computer system that can provide and/or implement a framework for an advisor, in accordance with various embodiments of the invention.

FIG. 2 illustrates one embodiment of a computer system 200, which may be exemplary of any of the computers described above. The computer system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a; a communications system 230 (e.g., a modem, a network card (wireless or wired), an infra-red communication device, etc.); and working memory 240, which may include RAM and ROM devices as described above. In some embodiments, the computer system 200 may also include a processing acceleration unit 235, which can include a DSP, a special-purpose processor and/or the like The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 120 and/or any other computer described above with respect to the system 100.

The computer system 200 may also comprise software elements, shown as being currently located within a working memory 240, including an operating system 245 and/or other code 250, such as an application program (which may be a client application, web browser, mid-tier application, RDBMS, etc.). The application programs may have instructions to (and/or be designed to) implement methods of the invention.

It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Other embodiments of the invention provide a software framework for an advisor, which may be a software component of an RDBMS and/or another, perhaps associated program. (It should be noted at this point that, while certain embodiments are described herein with respect to managing a database system, various embodiments of the invention could be implemented in any computer application in which it may be helpful to use an advisor to automate (to any degree), and/or assist a user and/or administrator in performing, any task and/or action, including without limitation, configuration and/or tuning tasks/actions, business tasks/actions, and/or the like.) In accordance with various embodiments, the software framework 300 may specify a common object model, including without limitation a common data model, a common set of interfaces and/or a common set of methods, which will be used by each of a plurality of advisors. Thus, each of the plurality of advisors may interact with other entities (users, other software components, other advisors, etc.) in a relatively standardized manner.

Figure 3:
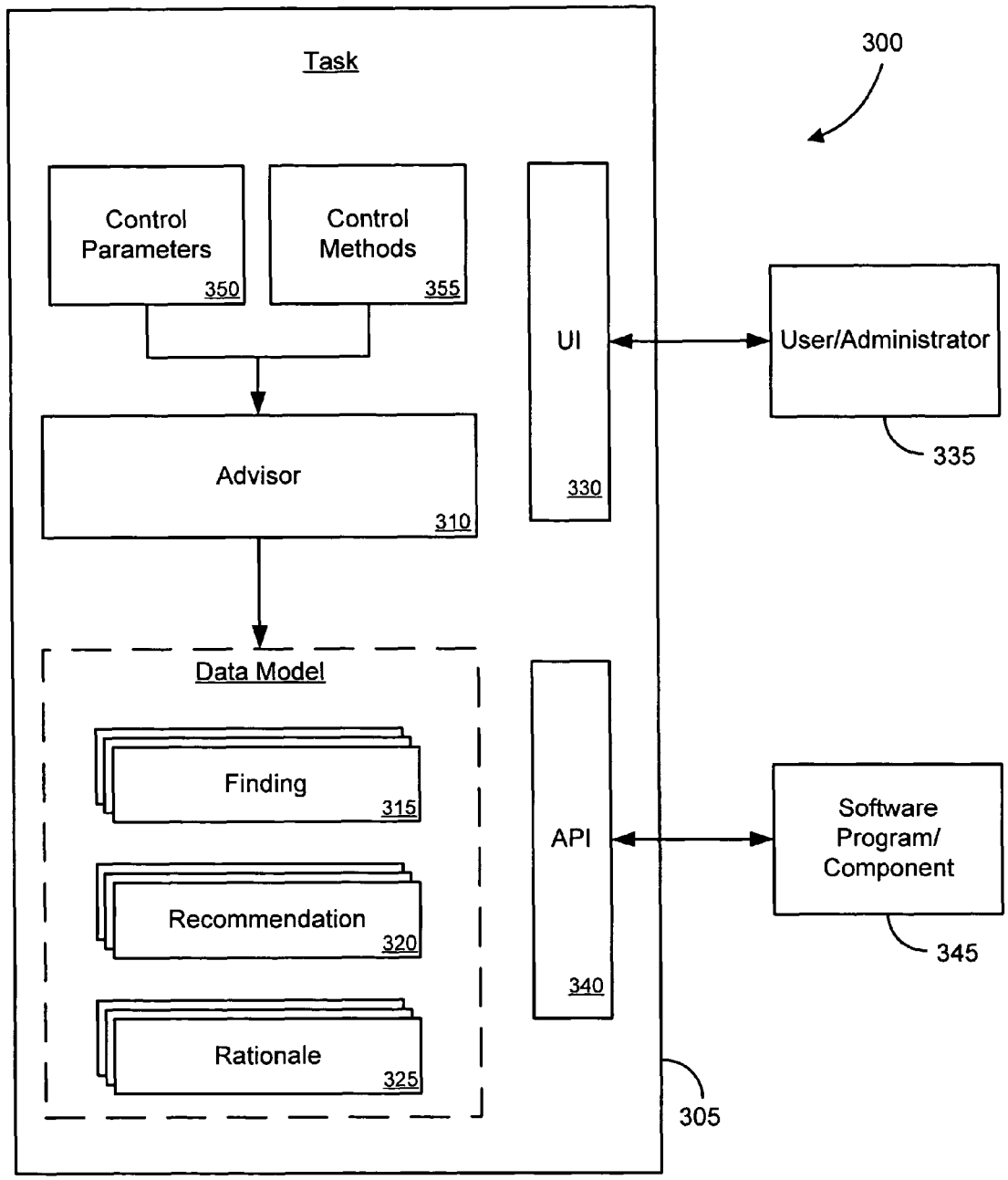
FIG. 3 illustrates a conceptual diagram of a framework for an advisor, in accordance with various embodiments of the invention.

FIG. 3 presents a conceptual illustration of a model 300 that may be specified by a software framework. The model 300 of FIG. 3 may include a task 305, which can serve as a container for an advisor component 310. In accordance with various embodiments (including some discussed in detail below), invoking an advisor 310 can result in the creation of a task 305, which may, in some cases be a software process, an application thread, etc., that provides a facility for controlling the behavior and/or execution of the advisor 310, as described below. In particular cases, a single advisor may be associated with a plurality of tasks, and/or a single task may be associated with a plurality of advisors. In other cases, a task and an advisor might have a one-to-one relationship (e.g., as illustrated on FIG. 3).

In particular embodiments, a framework can specify a standardized and/or disclosed data structure, and/or one or more standardized/disclosed interfaces, which can allow for advisors to be used interchangeably in various applications and/or to communicate in a standardized way with users and/or other components. Merely by way of example, in accordance with some embodiments, an advisor can be configured to generate and/or output a data structure comprising a set of one or more findings 315, one or more recommendations 320, and/or one or more rationales 325. Because, in some implementations, the data structure may adhere to a common and/or standardized data model, the advisor 310 can share data with other software components, including without limitation other advisors. Moreover, this data model may be extensible, as discussed in detail below, allowing for an advisor to comprise specialized features while still adhering to the common data model.

The advisor's data structure may be internal to the advisor and/or may be stored in one or more external database tables, files (including merely by way of example, XML files, etc). In a particular embodiment, a database may comprise a table and/or views for storing/viewing for viewing relevant data used by, generated by and/or about an advisor, including fields corresponding to each finding 315, recommendation 320 and/or rationale 325. In addition, the data structure may include meta-data about the advisor 310, such as information about ownership of the advisor, a status of the advisor 310 and/or task 305, the time/date the task 305 executed, various progress metrics, whether any recommendations 320 were implemented, the circumstance the advisor 310 was invoked to address, etc. Thus, for example, a record may be kept for each task in which an advisor was used, allowing an administrator to review past actions of advisors, etc.

In accordance with certain embodiments, an advisor may be used to investigate and/or analyze a circumstance in a database (as described in detail below). According to a data model in accordance with some embodiments of the invention, a finding data element 315 may be used to hold the results of the investigation/analysis. A finding 315 may indicate any of several conditions, including without limitation, a problem with the database (and/or a data element, configuration parameter, etc. thereof), a warning (which might indicate a condition indicative of a potential problem, which possibly could be remedied before it becomes a problem), a tuning opportunity, etc. In many cases, a finding 315 will result in a recommendation 320. In other cases, however, a finding may simply be informational, such that no action need be taken with respect to the finding (and, therefore, that no recommendation may be made). Alternatively, even if a finding is informational, some implementations of the data model may specify that an associated recommendation should made, even if it is a null recommendation (e.g., a recommendation to do nothing). In accordance with some embodiments, a finding may be stored as text (e.g., text in English and/or some other human language) and/or as code interpretable by other software components. In other embodiments, the finding could be stored with an internal format, and/or an interface (e.g., 330, 340) could provide a translation of that internal format for human and/or machine consumption.

An a advisor 310 sometimes may generate and/or store a plurality of findings 315. In some cases, the findings may be independent of one another. Merely by way of example, a particular circumstance or symptom may be caused by two or more independent conditions, the correction of each of which might independently provide a partial and/or complete remedy of the circumstance. In other cases, the findings may be related. Merely by way of example, an apparent circumstance and/or symptom may be caused by a particular condition, which itself may be caused and/or exacerbated by another, underlying condition. In such cases, the findings may be organized hierarchically (e.g., in a parent-child relationship), and/or the hierarchy may have any appropriate number of levels. In some cases, an advisor may generate both independent and related findings (e.g., two findings may be related, and third finding may be independent of the first two). In particular embodiments, the hierarchical organization of the findings may allow for a "root cause analysis" of the circumstance, allowing an administrator (and/or any other entity) to ascertain the true cause of the circumstance, instead of merely seeing the top-level cause for the symptom but not understanding any underlying causes.

As noted above, some findings may indicate that one or more actions should be taken to remedy a problem, tune the database, etc. In such cases (and/or as indicated above, even if no action need be taken), one or more recommendations 320 may be generated and/or stored. A recommendation 320 (assuming it is not a null recommendation) generally will comprise a set of one or more actions that can be taken to address a finding 315. In some cases, each finding 315 may correspond to a single recommendation 320 (which may incorporate a plurality of actions to be taken). In other cases, a single finding 315 may result in a plurality of recommendations 320 (each of which may incorporate one or more actions to be taken). Likewise, a plurality of findings 315 (especially, but not limited to, related findings) may result in a single recommendation 320 (which could include one or more actions that would address an underlying finding, thereby remedying related, higher-level findings, for example).

In accordance with various embodiments, a recommendation 320 may comprise any of a variety of actions, including without limitation, executable commands (such as the names of executable programs in the operating system of, e.g., a database server), API calls to other programs/components, etc. In particular embodiments, actions can be procedures that may be executed within a database (and/or an RDBMS) to operate on one or more objects, such as databases (and/or elements thereof, such as tables, rows, fields, etc.); indexes; database, RDBMS, and/or mid-tier application parameters; SQL statements and/or the like. In some cases, actions will be formatted and/or stored within a recommendation in an executable form (e.g., commands interpretable by a machine and/or software, such as the RDBMS, mid-tier application, etc.). In other cases, actions may comprise an explanatory string in a human language, which can be read by a human to understand what the action accomplishes. (In some cases, a user interface 330 may be used to provide such explanatory strings, perhaps by reference to a library of such strings cross-referenced against actions to which they apply, and/or an API 340 may be used to translate the actions into a form understood by a software component that may execute the action). In further implementations, the advisor 305 may provide output in a format, such as a script file, that may be executed at a later time by an administrator/user and/or used as an input file for another software component.

Optionally, the data model may include one or more rationales 325, which can be used to provide explanations of why particular findings 315 and/or recommendations 320 were made. In many cases, such rationales 325 are intended for human consumption and so might be formatted in a human language. In other cases, the recommendations 325 may be configured to be interpreted by a computer. Merely by way of example, a rationale 325 might include instructions to provide a hyperlink to additional information about the rationale 325 and/or might include instructions to configure an interface to display the rationale 325 in a particular manner, etc. In particular cases, the advisor 310 might provide one or more rationales for each finding 310 and/or recommendation 315.

In other cases, a single rationale 320 might provide an explanation for multiple findings 310 and/or recommendations 315.

Some embodiments of the invention provide for an extensible data model, such that the advisor 310 may define and/or register with a controlling application (e.g., an RDBMS) additional data elements (e.g., tables, records, fields, variables, etc.) that the advisor may need for its particular use. In some cases (e.g., if the data elements are registered), the data elements may be accessed/used by other components. In other cases, the data elements may be completely internal to the particular advisor that uses them. Merely by way of example, an advisor designed to assist in the tuning of SQL statements might include a data element for storing a query execution plan. Similarly, any other extended data elements that might be needed for an advisor may be included in the advisor's data structure.

The object model 300 may also have one or more interfaces allowing the task 305 and/or advisor 310 to communicate/interact with other entities, including without limitation a user interface 330 (which can provide for communication/interaction with an administrator and/or user 335) and/or an application programming interface ("API") 340 (which can provide for communication/interaction with other software components, programs, etc. 345, including, e.g., other advisors). Such interfaces may be defined according to a common model, such that each advisor includes a reliably standard interface for interacting with other entities.

As noted above, a task 305 might serve to control the behavior and/or execution of an advisor 310. The software framework may specify, therefore that the task 305, should have one or more control parameters 350, which may be used to configure how an advisor 310 operates, and/or one or more control methods 355, which can be used to control the operation/execution of the advisor 310 itself. Just as the data structure (including findings 315, recommendations 320, rationales 325 and/or extended data elements) can be considered an output of the advisor 310, the control parameters 350 and/or methods 355 can be considered inputs to the advisor 310.

In particular cases, control parameters 350 may be passed to the task as arguments (e.g., during invocation of the task) and/or may be selected as options prior to and/or during execution of the task 305. Merely by way of example, if an administrator invokes the task 305 using a dialog box, the control parameters may be specified (e.g., using checkboxes, etc.) on that dialog box. Examples of control parameters can include, without limitation, a mode in which the advisor should run (e.g., a limited mode, a comprehensive mode, etc.), a goal for the advisor (e.g., optimize storage efficiency, minimize execution time, etc.), a time limit in which the advisor must complete its operation, etc.

Control methods 355 that may be called to control the execution of the task 305 and/or advisor 310 can include, without limitation, methods to begin, interrupt, resume, cancel and/or delete the task 305 and/or advisor 310. (There may also be a timeout-based interrupt, familiar to those skilled in the art.) Further methods 355 can include a command to execute one or more actions specified in a recommendation, to roll back any changes made by an action, reset the task 305 (e.g., roll back any changes and/or restart the task 305 and/or advisor, perhaps with new configuration parameters), etc. Such methods can be called by a user/administrator and/or by a software component (which may have invoked the task 305 in the first place). A task 305 might include error-handling methods as well. In accordance with certain embodiments, the control and/or error handling methods 355 may be defined according to a common model, such that any advisor may be controlled in similar fashion, facilitating interoperability between advisors and other entities (e.g., users, software components and/or other advisors).

Figure 4:
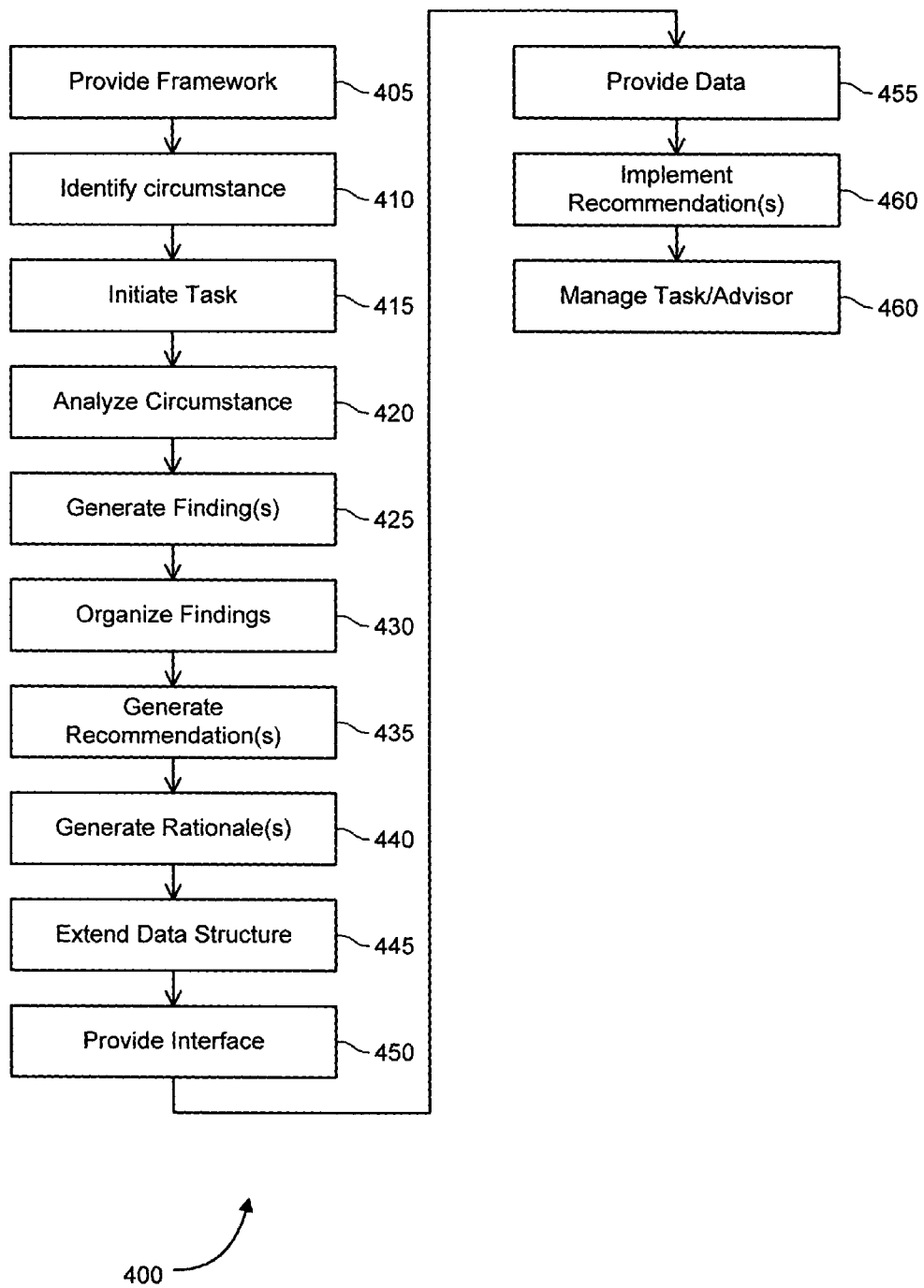
FIG. 4 is a process flow diagram that illustrates an exemplary method of that can providing and/or implementing an advisor framework and/or advisors complying with the advisor framework, in accordance with various embodiments of the invention.

As noted above, another set of embodiments includes methods of implementing a software framework for advisors and/or using such advisors to address a circumstance in a database. FIG. 4 is a process flow diagram that illustrates several exemplary methods (referred to collectively by the reference numeral 400) of implementing and/or using advisors. For ease of description the process the methods 400 will be described, in some cases, by reference to the components illustrated by FIG. 3. It should be appreciated, however, that various methods of the invention are not limited to any particular functional and/or structural implementation, and therefore, that the descriptions herein should be considered merely illustrative and not limiting.

In accordance with some embodiments, a method 400 may comprise providing a standardized software framework for implementing advisors (block 405). The framework may specify a common data model to which each advisor should adhere. Merely by way of example, as described in detail above, the common data model may include one or more findings, recommendations and/or rationales. Further, the common data model may be extensible. The framework may also specify a comment interface (and/or set of interfaces), which can include, inter alia, user interfaces and/or APIs. The framework may also specify a set of one or more methods and/or parameters that may be used to control and/or configure the behavior and/or execution of the advisor. In particular embodiments, the framework may provide a task model, wherein a task is initiated to implement each advisor.

In other embodiments, the method 400 may include identifying a circumstance in a database that may require and/or provide an opportunity for database management (block 410). Identifying a circumstance may take any of several forms. Merely by way of example, an administrator may detect a circumstance that the administrator believes needs to be addressed. (As one example, the administrator) may feel that a database is insufficiently responsive under particular circumstances and therefore may wish to tune the database (and/or the RDBMS) to address the circumstance.) The administrator may execute a tuning/troubleshooting application, which (perhaps after collecting some preliminary information from the administrator) may determine that a particular advisor is the proper advisor to address the issue. In other cases, a monitoring function and/or module may detect a problem and/or condition that should be addressed. Those skilled in the art will appreciate, based on the disclosure herein, that a circumstance may be identified in a variety of ways.

A task may be initiated to implement an advisor to assess/address the circumstance (block 415). The advisor may adhere to the software framework. A task may be initiated by a user/administrator (perhaps using a program and/or module designed to allow the user to interface with an advisor system. Alternatively, a task may be initiated by another software component. Merely by way of example, a monitoring module may initiate a task to address a perceived potential problem detected by that monitoring module. In particular embodiments, a task may be invoked by an advisor (e.g., a second advisor may be used to implement a recommendation made by the original advisor).

At block 420, the circumstance may be investigated/analyzed. Investigation and/or analysis of a circumstance may include any of a variety of investigative and/or analytical routines known in the art for troubleshooting and/or tuning an application. Merely by way of example, U.S. app. Ser. No. 10/775,531 entitled "AUTOMATIC DATABASE DIAGNOSTIC MONITOR ARCHITECTURE" and filed Feb. 9, 2004 by Dias et al., the entire disclosure of which is incorporated herein by reference, describes some exemplary routines.

Based on the investigation/analysis, one or more findings (described in detail above) may be generated and/or stored (block 425). If a plurality of related findings are generated, those findings may be organized hierarchically (block 430), e.g., indicating, as described above, that a finding relates to a problem that is caused by another problem, which has its own finding. Alternatively, a single finding could be generated for a chain of related problems.

Based on the findings, one or more recommendation(s) may be generated and/or stored (block 435). Each advisor may include instructions for generating recommendations, so the procedure for generating recommendations can depend on the advisor. In many cases, the advisor can be configured to generate instructions that configure the database to address a particular finding. Such recommendations can be based on a goal for the advisor, on logic that provides instructions on how to address a particular circumstance (such as parameter misconfiguration, inefficient SQL statements, etc.). Merely by way of example, U.S. app. Ser. No. 10/775,531, already incorporated by reference, provides some ways in which advisors may be configured to generate recommendations. In accordance with other embodiments, a software program implementing an advisor system may include a library and/or database of common configuration and/or operational problems, as well as potential solutions for those problems, and generating a recommendation may comprise referencing the library to find a solution for the condition(s) identified in the findings.

At block 440, one or more rationales, which may explain and/or justify the finding(s) and/or recommendation(s) may be generated. In particular embodiments, a library/database (such as the library/database discussed above) may include a variety of entries describing why a particular solution is appropriate to address a particular condition, and generating a rationale can comprise including a relevant entry from such a library/database, perhaps with modifications according to the particular finding/recommendation the rationale explains.

As noted above, a software framework for advisors may provide for an extensible data structure/model, and for a particular advisor, it may be appropriate to extend the advisor's data structure to include additional data elements required by that advisor (block 445). An advisor may be designed with an extended data structure and/or an advisor's data structure may be extended during the execution of that advisor, as needed. Extending a data structure can include adding additional data elements (including, as discussed above, tables, fields, variables, etc.) to accommodate additional data used and/or produced by the advisor.

In some cases, one or more interfaces may be provided (block 450), which can allow an advisor to communicate/interact with another entity (such as a user, a software component—which may be another advisor—and/or the like). The interfaces, which may include user interfaces, APIs, etc., may adhere to the software framework. At block 455, data may be provided to another entity, perhaps via one or more interfaces. Providing data may include displaying one or more findings, recommendations and/or rationales via a user interface (which may include, inter alia, a web browser, a database client, etc.) and/or allowing a user to choose, perhaps via the user interface, to implement any of the recommendations. Providing data can also including transmitting (and/or making accessible), e.g., via an API, to another software component (perhaps another advisor) one or more findings, recommendations and/or rationales. In other embodiments, providing data can include generating a script file for another entity, and/or the script file can include one or actions, which may be incorporated in one or more of the generated recommendations.

Alternatively and/or in addition, one or more of the recommendations may be implemented (block 460). Implementing a recommendation can comprise executing any or all of the actions incorporated in and/or referenced by the recommendation. In some cases, the advisor generating the recommendation (and/or the task comprising the advisor) may execute these actions. In other cases, another software component may be called (e.g., via an API) to implement the actions. In yet further cases, a user may manually call various software components to implement the actions (perhaps through a user interface, which might provide a facility to access such components through an API, etc.).

A task and/or an advisor may be managed (block 460). Managing a task/advisor can include calling one or more methods (which may be part of a set of methods specified by the software framework). Various management tasks are possible, including those discussed above. Merely by way of example, a task and/or an advisor may be executed, interrupted, canceled, restarted (perhaps with different configuration parameters, etc.). Further, any changes made by the task/advisor may be rolled back. In some cases, a task may manage itself (e.g., via a timeout-based interrupt). In other cases, a user may manage the task/advisor and/or another software component (which may have initiated the task) may manage the task.

In the foregoing description, for the purposes of illustration, various methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable mediums suitable for storing electronic instructions.

For instance, some embodiments of the invention provide software programs, which may be executed on one or more computers, for performing the methods described above. Alternatively, the methods may be performed by a combination of hardware and software.

Hence, various embodiments of the invention provide a software framework for an advisor, as well as methods, systems and software products implementing such as software framework and/or using advisors adhering to the framework for responding to a circumstance in a database. The description above identifies certain exemplary embodiments for implementing the invention, but those skilled in the art will recognize that many modifications and variations are possible within the scope of the invention. The invention, therefore, is defined only by the claims set forth below.

What is claimed is:

1. In a database environment, a software framework, embodied on a computer readable storage medium, for facilitating an interaction between an advisor component and another entity, the software framework comprising:

a task configured to perform an operation in a database, in response to a circumstance in the database;

a tuning application associated with the task, the tuning application configured to collect information about the circumstance and based on the collected information, select an advisor component from a plurality of advisor components which is equipped to handle the circumstance; and a selected advisor component associated with the task and the tuning component and configured to assist in the performance of the operation, wherein the plurality of advisor components are configured to interact with each of the plurality of advisor components in a standardized manner using a framework which specifies a common data model for which all of the plurality of advisor components and the selected advisor component to comply with, such that each of the plurality of advisor components and the selected advisor are configured to be replaced interchangeably one with another, wherein each of the plurality of advisor components are configured to be interchanged with the selected advisor such that any one of the plurality of advisor components is configured to replace the selected advisor to be designated as the selected advisor, and wherein each of the plurality of advisor components include advisor-specific instructions for determining findings, generating recommendations, and explaining rationales, and wherein based at least on the advisor-specific instructions, the advisor generates a data structure comprising:

at least one finding comprising one or more improvements or corrections to the database, wherein the at least one finding further comprises information about a result of an analysis performed by the advisor and wherein the at least one finding is based on a combined analysis of at least one of the plurality of advisor components and the analysis of the selected advisor using the common data model;

at least one recommendation based on the at least one finding, wherein the at least one recommendation comprises a set of at least one action to perform in response to the at least one finding; and at least one rationale that explains, to a user, why the advisor component made the at least one recommendation;

wherein:

the advisor is configured to provide the at least one recommendation and the at least one rationale in a format that may be understood by the entity, such that the entity can perform the at least one action in response to the at least one finding;

the advisor is further configured to display, for the user, the at least one finding, the at least one recommendation, and the at least one rationale, and wherein the data structure is configured to be extensible, such that the data structure can be configured to comprise at least one additional data element addressing a specific need of the advisor component.

2. The software framework as recited in claim 1, wherein the task is further configured to be managed by the user.

3. The software framework as recited in claim 1, wherein the task governs the execution of the advisor component.

4. The software framework as recited in claim 1, wherein the entity is the user.

5. The software framework as recited in claim 4, wherein the at least one recommendation is provided in such a way to allow the user to instruct the advisor that the at least one action should be performed.

6. The software framework as recited in claim 5, wherein the at least one recommendation is provided in a dialog box configured to allow the user to accept the recommendation, wherein if the user accepts the recommendation, the at least one action is performed.

7. The software framework as recited in claim 1, wherein:
the advisor component is a first advisor component; and
the entity is a second advisor component.

8. The software framework as recited in claim 7, wherein the at least one recommendation is provided as a set of at least one command that, if executed by the second advisor component, will result in the performance of the at least one action.

9. The software framework as recited in claim 1, wherein the entity is a mid-tier application in communication with the database.

10. The software framework as recited in claim 1, wherein the at least one finding is a plurality of findings, and wherein the plurality of findings are organized in a hierarchical manner, such that the entity may ascertain from the organization of the plurality of findings a chain of analysis represented by the findings.

11. The software framework as recited in claim 1, wherein the circumstance is identified by a relational database management system comprising the software framework.

12. The software framework as recited in claim 1, wherein the circumstance is identified by the advisor component.

13. The software framework as recited in claim 1, wherein the circumstance is identified by the entity.

14. The software framework as recited in claim 1, wherein the circumstance is a configuration problem experienced by the database.

15. The software framework as recited in claim 1, wherein the circumstance is an opportunity to tune the database.

16. The software framework as recited in claim 1, wherein the advisor component is configured to be invoked by the entity.

17. The software framework as recited in claim 16, wherein the entity is a software component, and wherein the software framework further comprises an API that provides an interface for the software component to invoke the advisor component.

18. A computer system, comprising:
a database;
a processor in communication with the database; and
a computer readable storage medium in communication with the processor, the computer readable storage medium comprising instructions executable by the processor to:
provide a common data model to be used by a plurality of advisor components, the plurality of advisor components being operable to perform actions to address a plurality of conditions in the database, each advisor being operable to perform one or more actions to address a particular condition, the common data model comprising:
a tuning application configured to collect information about at least one finding comprising one or more improvements or corrections to the database and based on the collected information, select an advisor component from the plurality of advisor components which is equipped to handle the at least one finding, wherein the selected advisor includes advisor-specific instructions for generating recommendations and explaining rationales;
wherein the plurality of advisor components are configured to interact with each of the plurality of advisor components in a standardized manner using a framework which specifies the common data model which all of the plurality of advisor components and the selected advisor component to comply with, such that each of the plurality of advisor components and the selected advisor are configured to be replaced interchangeably one with another, wherein each of the plurality of advisor components are configured to be interchanged with the selected advisor such that any one of the plurality of advisor components is configured to replace the selected advisor to be designated as the selected advisor;
generate, with the selected advisor component, a data structure adhering to the common data model comprising:
the at least one finding comprising information about a result of an analysis performed by the selected advisor component and wherein the at least one finding is based on a combined analysis of at least one of the plurality of advisor components and the analysis of the selected advisor using the common data model;
at least one recommendation based on the at least one finding, wherein the at least one recommendation comprises a set of at least one action to perform in response to the at least one finding; and
at least one rationale that explains, to a user, why the selected advisor component made the at least one recommendation;
display, for the user, an output from the selected advisor component, and
wherein the data structure is configured to be extensible, such that the data structure can be configured to comprise at least one additional data element addressing a specific need of the advisor component.

19. A computer system comprising:
a database;
a processor in communication with the database; and
a computer readable storage medium in communication with the processor, the computer readable storage medium comprising instructions executable by the processor to:
identify a circumstance in the database;
collect information about the circumstance;
based on the collected information, select an advisor component from a plurality of advisor components which is equipped to handle the circumstance, wherein the selected advisor includes advisor-specific instructions for determining findings, generating recommendation, and explaining rationales, wherein the plurality of advisor components are configured to interact with each of the plurality of advisor components in a standardized manner using a framework which specifies a common data model for which all of the plurality of advisor components and the selected advisor component to comply with, such that each of the plurality of advisor components and the selected advisor are configured to be replaced interchangeably one with another, wherein each of the plurality of advisor components are configured to be interchanged with the selected advisor such that any one of the plurality of advisor components is configured to replace the selected advisor to be designated as the selected advisor;
initiate a task, wherein the task comprises the selected advisor component;
analyze the circumstance with the selected advisor component;
produce, with the selected advisor component, a plurality of findings comprising one or more improvements or corrections to the database, as a result of the analysis of the circumstance and further is a result of a combined analysis of at least one of the plurality of advisor components and the analysis of the circumstance using the common data model;

organize the plurality of findings in a hierarchical manner, to allow a user to ascertain, from the organization of the plurality of findings, a chain of analysis represented by the plurality of findings;

generate with the selected advisor component at least one recommendation based on the plurality of findings, wherein the at least one recommendation comprises a set of at least one action to perform in response to the plurality of findings;

provide the at least one recommendation in a format that may be understood by an entity, such that the entity can perform the at least one action in response to the plurality of findings; and display, for the user, at least one rationale that explains, to the user, why the at least one recommendation was made;

wherein the plurality of finding and the at least one recommendation are incorporated within a data structure that adheres to the common data model specified by the framework; and wherein the data structure is configured to be extensible, such that the data structure can be configured to comprise at least one additional data element addressing a specific need of the advisor component.

20. A computer program stored on a computer readable storage medium for implementing an advisor framework, the computer program comprising instructions executable by a computer to:

provide a common data model to be used by a plurality of advisor components, the plurality of advisor components being operable to perform actions to address a plurality of conditions in the database, each advisor being operable to perform one or more actions to address a particular condition, the common data model comprising:

a tuning application configured to collect information about at least one finding and based on the collected information, select an advisor component from the plurality of advisor components which is equipped to handle the at least one finding wherein the selected advisor includes advisor-specific instructions for generating recommendations and explaining rationales;

wherein the plurality of advisor components are configured to interact with each of the plurality of advisor components in a standardized manner using a framework which specifies the common data model for which all of the plurality of advisor components and the selected advisor component to comply with, such that each of the plurality of advisor components and the selected advisor are configured to be replaced interchangeably one with another, wherein each of the plurality of advisor components are configured to be interchanged with the selected advisor such that any one of the plurality of advisor components is configured to replace the selected advisor to be designated as the selected advisor;

generate, with the selected advisor component, a data structure adhering to the common data model comprising:

the at least one finding comprising information about a result of an analysis performed by the selected advisor component and wherein the at least one finding is based on a combined analysis of at least one of the plurality of advisor components and the analysis of the selected advisor using the common data model;

at least one recommendation based on the at least one finding, wherein the at least one recommendation comprises a set of at least one action to perform in response to the at least one finding; and at least one rationale that explains, to a user, why the selected advisor component made the at least one recommendation;

display, for the user, an output from the selected advisor component, and wherein the data structure is configured to be extensible, such that the data structure can be configured to comprise at least one additional data element addressing a specific need of the advisor component.

21. The computer program as recited in claim 20, wherein the computer program is incorporated in a relational database management system.

22. The computer program as recited in claim 20, wherein the computer program is configured to interoperate with a relational database management system.

23. A computer program stored on a computer-readable storage medium for responding to a circumstance in a database, the computer program comprising:

an advisor component; and instructions executable by a computer to:

identify a circumstance in the database;

collect information about the circumstance;

based on the collected information, select an advisor component from a plurality of advisor components which is equipped to handle the circumstance, wherein the selected advisor includes advisor-specific instructions for determining findings, generating recommendation, and explaining rationales, wherein the plurality of advisor components are configured to interact with each of the plurality of advisor components in a standardized manner using a framework which specifies a common data model which all of the plurality of advisor components and the selected advisor component to comply with, such that each of the plurality of advisor components and the selected advisor are configured to be replaced interchangeably one with another, wherein each of the plurality of advisor components are configured to be interchanged with the selected advisor such that any one of the plurality of advisor components is configured to replace the selected advisor to be designated as the selected advisor;

initiate a task, wherein the task comprises the selected advisor component;

analyze the circumstance with the selected advisor component;

produce, with the selected advisor component, a plurality of findings comprising one or more improvements or corrections to the database, as a result of the analysis of the circumstance and further is a result of a combined analysis of at least one of the plurality of advisor components and the analysis of the circumstance using the common data model;

organize the plurality of findings in a hierarchical manner, to allow a user to ascertain, from the organization of the plurality of findings, a chain of analysis represented by the plurality of findings;

generate with the selected advisor component at least one recommendation based on the plurality of findings, wherein the at least one recommendation comprises a set of at least one action to perform in response to the plurality of findings; and provide the at least one recommendation in a format that may be understood by an entity, such that the entity can perform the at least one action in response to the plurality of findings; and display, for the user, at least one rationale that explains, to the user, why the at least one recommendation was made;

wherein the plurality of finding and the at least one recommendation are incorporated within a data structure that adheres to the common data model specified by the framework; and wherein the data structure is configured to be extensible, such that the data structure can be configured to comprise at least one additional data element addressing a specific need of the advisor component.

24. The computer program as recited in claim 23, wherein the entity is a second advisor component.

25. The computer program as recited in claim 24, wherein the computer program further comprises the second advisor component.

26. The computer program as recited in claim 23, further comprising: an interface configured to allow the computer program to interact with the entity.

27. The computer program as recited in claim 26, wherein the interface is configured to allow the entity to initiate the task.

28. The computer program as recited in claim 26, wherein the interface is configured to provide to the entity a set of at least one command that, if executed by the entity, will result in the performance of the at least one action.

29. The computer program as recited in claim 26, wherein the interface comprises an API.

* * * * *

UNITED STATES PATENT AND TRADEMARK OFFICE
CERTIFICATE OF CORRECTION

| | | |
|---|---|---|
| PATENT NO. | : 7,873,606 B2 | Page 1 of 1 |
| APPLICATION NO. | : 10/925831 | |
| DATED | : January 18, 2011 | |
| INVENTOR(S) | : Karl Dias et al. | |

It is certified that error appears in the above-identified patent and that said Letters Patent is hereby corrected as shown below:

Title page, Item (57), "Abstract", line 14-15, before "In particular embodiments," delete "In particular embodiments.".

Title page, Item (57), "Abstract", line 16, delete "on" and insert -- one --, therefor.

In column 1, line 62, before "In particular embodiments," delete "In particular embodiments.".

In column 5, line 10, before "In particular embodiments," delete "In particular embodiments.".

In column 5, line 11, delete "on" and insert -- one --, therefor.

In column 9, line 4, delete "like" and insert -- like. --, therefor.

In column 10, line 56, delete "An a" and insert -- An --, therefor.

In column 13, line 10, delete "description" and insert -- description of --, therefor.

Signed and Sealed this
Twenty-seventh Day of December, 2011

David J. Kappos
*Director of the United States Patent and Trademark Office*